(12) United States Patent
Aufranc et al.

(10) Patent No.: US 11,225,892 B2
(45) Date of Patent: Jan. 18, 2022

(54) EXHAUST GAS HEATING DEVICE, IN PARTICULAR FOR A COMBUSTION ENGINE, COMPRISING A GRID WHEREIN AN ELECTRIC CURRENT RUNS

(71) Applicant: FAURECIA SYSTEMES D'ECHAPPEMENT, Nanterre (FR)

(72) Inventors: Guillaume Aufranc, Courcelles-les-Montbeliard (FR); Xavier Bartolo, Etouvans (FR); Maxime Goncalves, Belfort (FR); Christophe Tournier, Etouvans (FR)

(73) Assignee: FAURECIA SYSTEMES D'ECHAPPEMENT

( * ) Notice: Subject to any disclaimer, the term of this patent is extended or adjusted under 35 U.S.C. 154(b) by 135 days.

(21) Appl. No.: 16/589,422

(22) Filed: Oct. 1, 2019

(65) Prior Publication Data
US 2020/0109652 A1    Apr. 9, 2020

(30) Foreign Application Priority Data

Oct. 5, 2018 (FR) ...................... 18 59232

(51) Int. Cl.
*F01N 3/20*      (2006.01)
*F01N 13/16*     (2010.01)

(52) U.S. Cl.
CPC .......... *F01N 3/2013* (2013.01); *F01N 3/2006* (2013.01); *F01N 13/16* (2013.01); *F01N 2240/16* (2013.01)

(58) Field of Classification Search
CPC .. F01N 13/16; F01N 13/1805; F01N 2240/16; F01N 3/2006; F01N 3/2013
See application file for complete search history.

(56) References Cited

U.S. PATENT DOCUMENTS

| | | | |
|---|---|---|---|
| 4,505,107 A * | 3/1985 | Yamaguchi | F01N 3/027 55/283 |
| 4,523,935 A | 6/1985 | Takagi et al. | |
| 4,671,058 A | 6/1987 | Yoshida et al. | |
| 4,723,973 A * | 2/1988 | Oyobe | F01N 3/027 219/552 |
| 4,872,889 A * | 10/1989 | Lepperhoff | F01N 3/027 55/282.3 |
| 7,810,318 B2 * | 10/2010 | Gonze | F01N 3/00 60/295 |
| 2014/0343747 A1 * | 11/2014 | Culbertson | F01N 3/2013 700/300 |
| 2017/0226909 A1 * | 8/2017 | Hirth | F01N 3/2828 |

FOREIGN PATENT DOCUMENTS

DE   102014115923 A1   5/2016

* cited by examiner

*Primary Examiner* — Anthony Ayala Delgado
(74) *Attorney, Agent, or Firm* — Carlson, Gaskey & Olds, P.C.

(57) ABSTRACT

A heating device comprises a grid and a power supply device connected to the grid to pass an electric current in the grid. The grid is formed by strands delimiting openings between the strands. The strands of the grid do not overlap.

18 Claims, 4 Drawing Sheets

EXHAUST GAS HEATING DEVICE, IN PARTICULAR FOR A COMBUSTION ENGINE, COMPRISING A GRID WHEREIN AN ELECTRIC CURRENT RUNS

CROSS-REFERENCE TO RELATED APPLICATIONS

This application is a U.S. non-provisional application claiming the benefit of French Application No. 18 59232, filed on Oct. 5, 2018, which is incorporated herein by its entirety.

TECHNICAL FIELD

The present invention relates to an exhaust gas heating device, in particular for a combustion engine.

BACKGROUND

Such a heating device is intended to heat the exhaust gases and a catalyst, in order to optimize the catalytic conversion of the polluting gases, in a moving vehicle, such as an automobile, a truck, a ship, or in a stationary engine, such as a generating set.

A heating device of this type includes a grid and electrical supply device connected to the grid to pass electric current in said grid.

The invention in particular aims to improve and simplify the production of such a heating device.

SUMMARY

An exhaust gas heating device for a combustion engine comprises a grid and power supply device connected to the grid to pass electrical current in the grid. The grid is formed by strands delimiting openings between the strands, and the strands of the grid do not overlap.

Eliminating the overlaps makes it possible to simplify the mass production of the device.

It is in particular possible, optionally, to give the grid a shape discouraging the appearance of hotspots, and devoid of weak areas. In this case, the lifetime and performance of the grid are improved.

A heating device according to the invention may further include one or more of the following features, considered alone or according to any technically possible combinations:

The grid has a geometric shape defined around a central point, the strands are connected to each other in junction zones and have, between the junction zones, a same width, and each junction zone has a first dimension, in a first radial direction defined from said central point and separating the junction zone into two equal surface portions, and a second dimension in a second direction perpendicular to the first radial direction, such that the first dimension and/or the second dimension is larger than or equal to twice the width of each strand.

The grid has a constant thickness.

The grid has an oval, ellipsoid, or circular outer contour.

The strands are connected to one another in junction zones, and have, between the junction zones, a same width, and comprises an inner central ring from which the strands extend outward, the inner central ring having a width greater than or equal to twice the width of each strand.

The strands are connected to one another in junction zones, and have, between the junction zones, a same width, and the grid comprises an outer ring from which the strands extend inward, the outer ring having a width greater than or equal to twice the width of each strand.

The grid has a geometric shape defined around a central point, each opening is generally quadrilateral-shaped, preferably diamond-shaped, the height thereof being defined along a radial direction extending from the central point, each opening having a recess at each end of its height, and the recess is formed by a hollow connecting the contours of two adjacent strands delimiting the opening, said hollow being tangential to each of said two contours.

The grid is of the type made by cutting a sheet of conductive material.

According to a second aspect, the invention also relates to an exhaust line of a combustion engine, and which includes a heating device as previously defined.

According to a third aspect, the invention lastly relates to a vehicle, which comprises an exhaust line as previously defined.

BRIEF DESCRIPTION OF THE DRAWINGS

The invention will be better understood upon reading the following description, provided solely as an example and done in reference to the appended figures, in which.

DETAILED DESCRIPTION

Figure 1:
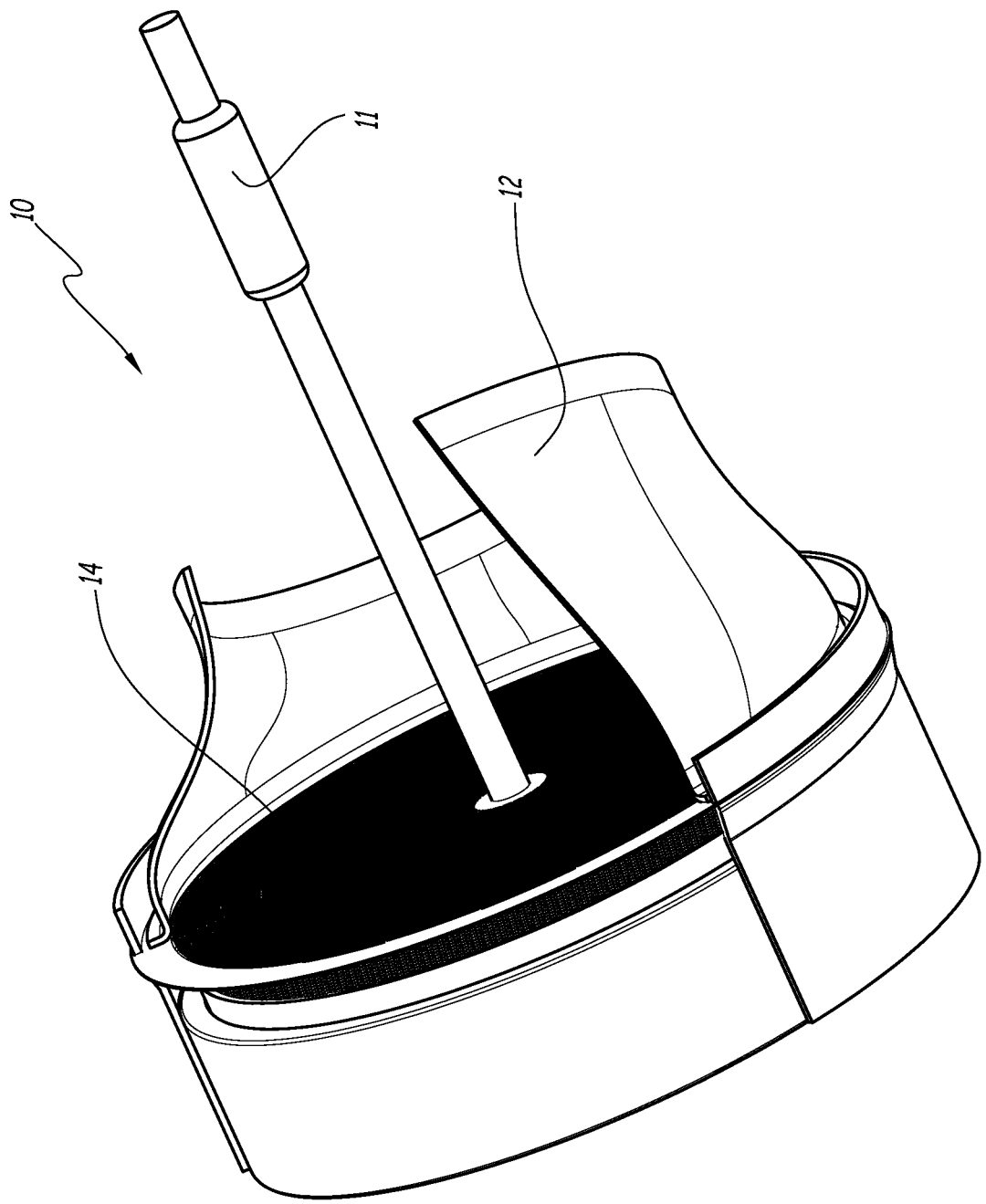
FIG. 1 is a perspective view of a heating device according to one example of the invention.
Figure 2:
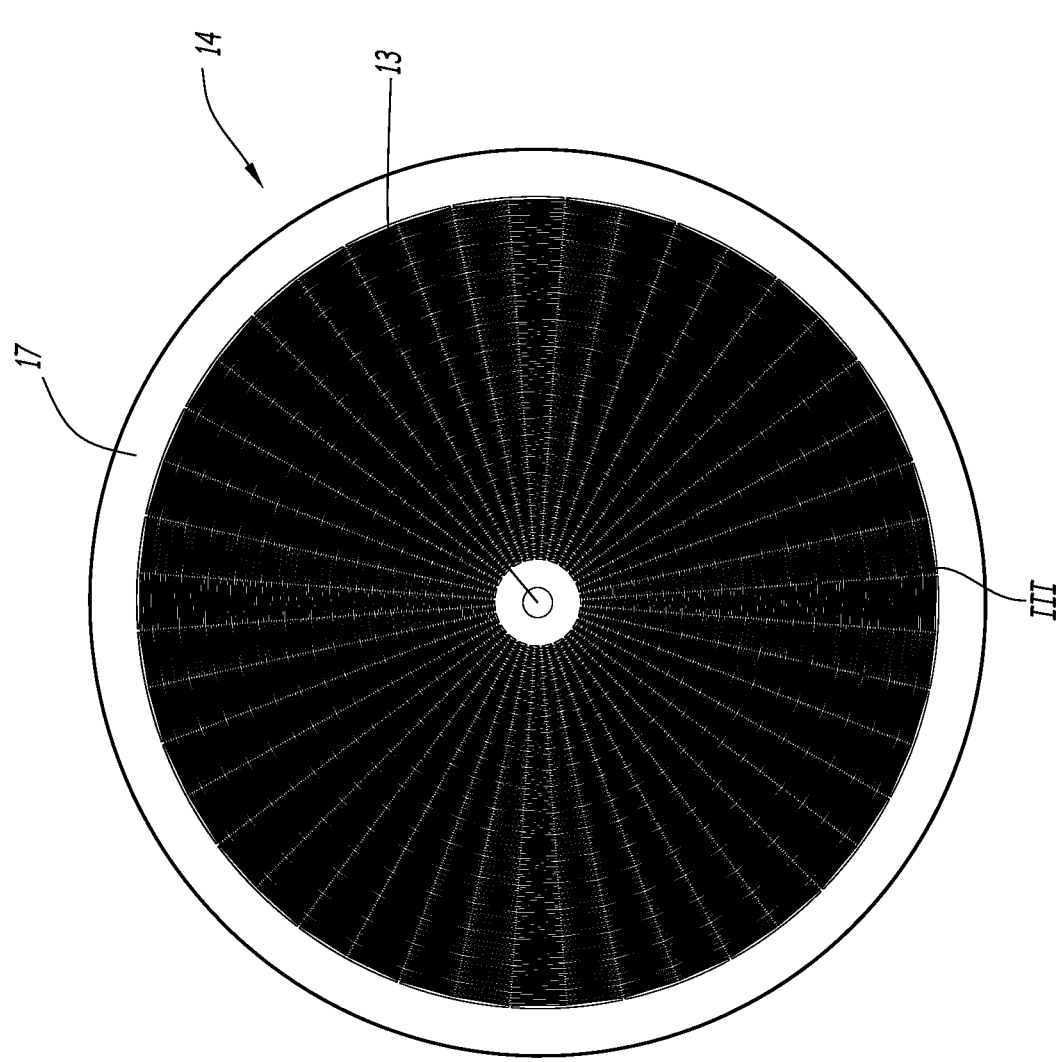
FIG. 2 is a front view of a grid equipping the heating device of FIG. 1.
Figure 3:
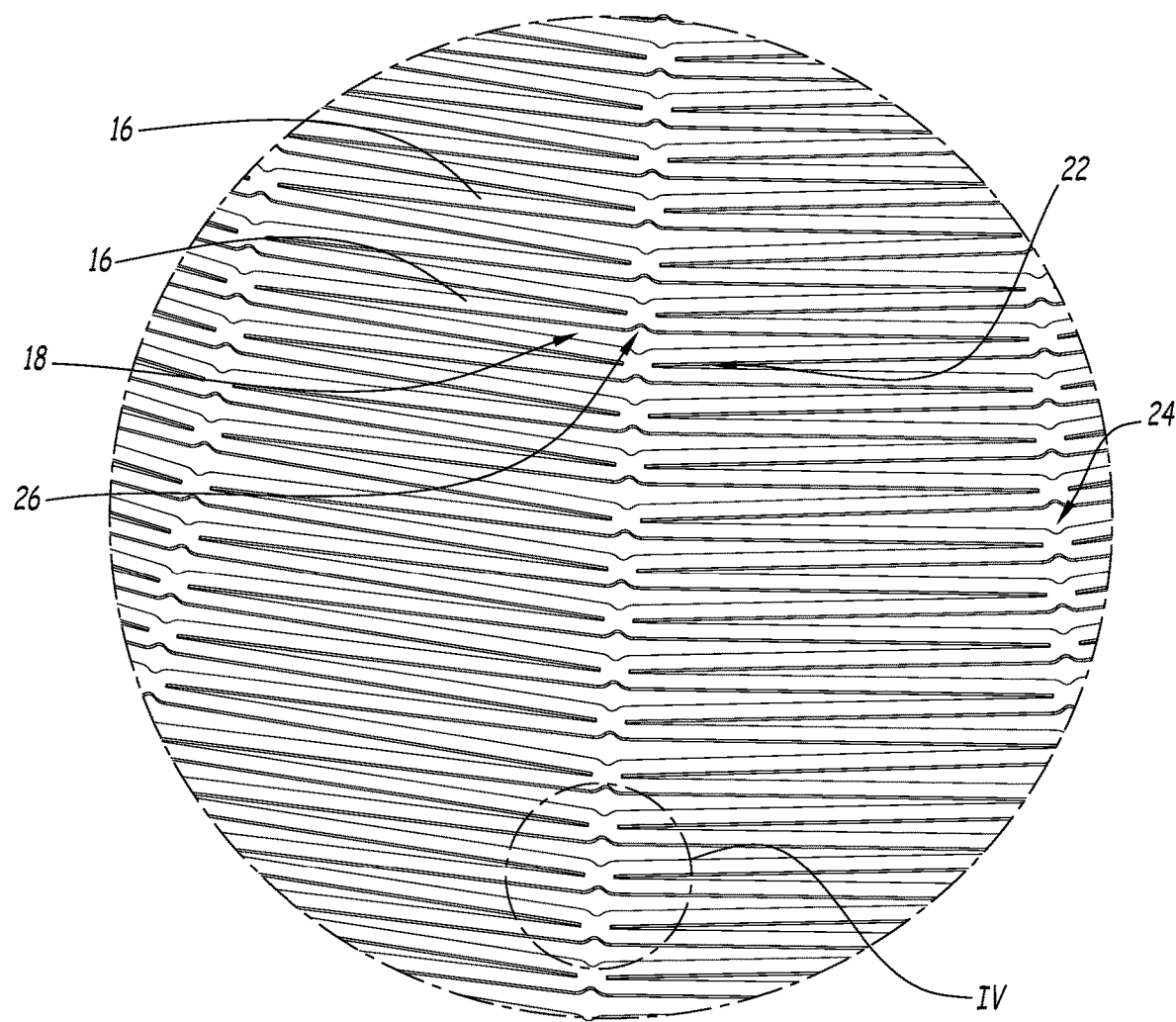
FIG. 3 is a detail marked III of FIG. 2.

FIG. 1 shows an exhaust gas heating device 10 according to one exemplary embodiment of the invention. The heating device 10 is suitable for being arranged in an exhaust line, through which the exhaust gases are suitable for circulating, near a catalyst.

The heating device 10 includes a cylindrical housing 12, for example, having a generally cylindrical shape with a circular base.

The heating device 10 furthermore comprises electrical supply device 11, and more particularly a connector to an electric current supply source, not shown.

The heating device 10 furthermore includes a grid 14 made from a conductive material.

The conductive material is, for example, chosen from Iron-Chromium-Aluminum (FeCrAl) and alloys thereof, Nickel-Chromium (NiCr) and alloys thereof, stainless steel, Inconel® or silicon carbide. For example, the material is Kanthal® A1, Nichrome® 80 or Nikrothal® 80.

Such a grid is formed from strands 16 delimiting openings 18 between them, the strands 16 being connected to one another in junction zones 20.

According to the invention, the strands 16 do not overlap. Thus, the grid 14 has a substantially constant thickness.

The strands 16 have a same width between the junction zones 20. It will be noted that, on each strand 16, the smallest dimension is the thickness, the largest dimension is the length, and the third dimension is the width.

The grid 14 has a geometric shape defined around a central point. For example, the grid 14 has an oval, elliptical or circular outer contour.

Figure 4:
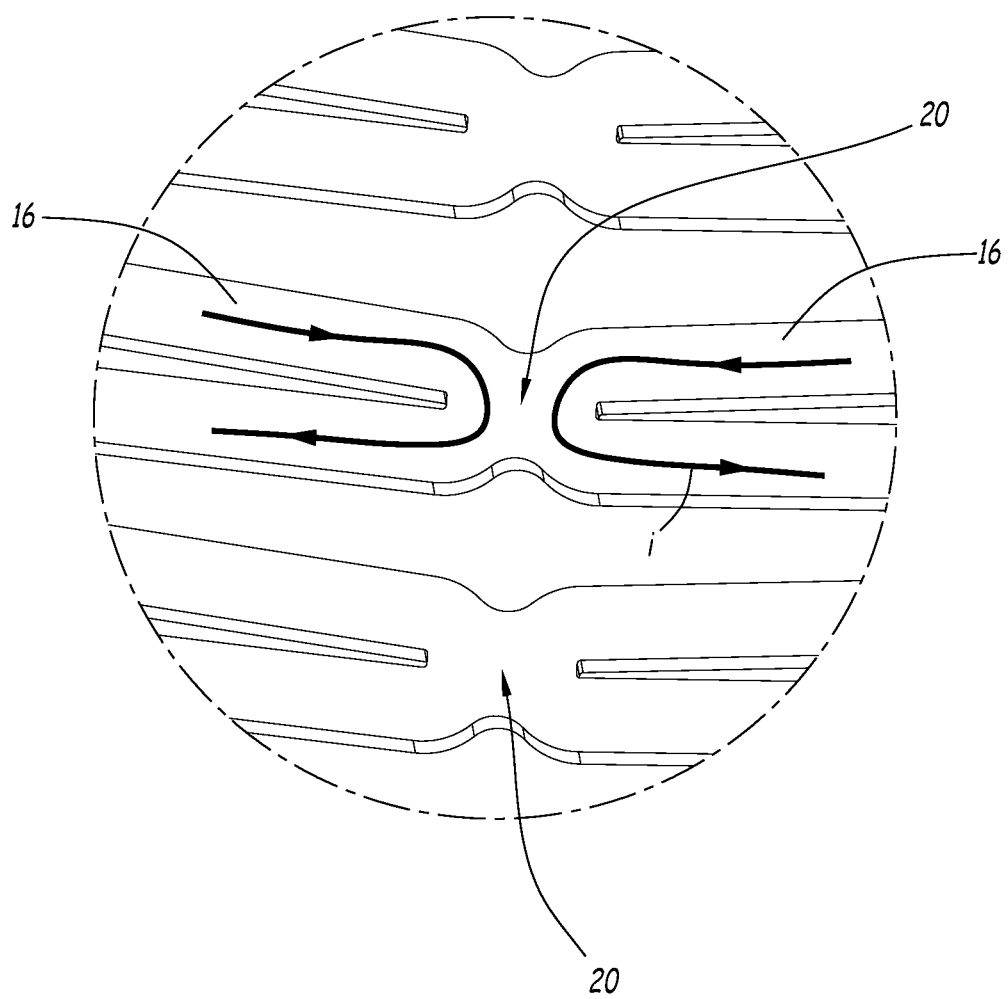
FIG. 4 is a schematic view of a detail marked IV of the grid of FIG. 3.

Advantageously, as in particular shown in FIG. 4, each junction zone 20 has a first dimension, in a first radial direction defined from said central point and separating the junction zone 20 into two equal surface portions, and a second dimension in a second direction perpendicular to the first radial direction, such that the first dimension and/or the second dimension is larger than twice the width of each strand 16.

The grid 14 is connected to the electrical supply device 11, such that the electrical supply device 11 is capable of causing a current i to travel in the strands 16.

Advantageously, the grid 14 comprises an inner central ring 13, from which the sets of strands 16 extend radially outward. The inner central ring 13, for example, has a width greater than or equal to twice the width of each strand 16.

Advantageously, the grid 14 preferably also comprises an outer ring 17, from which the strands 16 extend inward. The outer ring 17, for example, has a width greater than or equal to twice the width of each strand 16.

The grid 14 is of the type made by cutting a sheet of conductive material, for example a metallic sheet. The grid 14, for example, has a thickness of between 0.05 and 2 mm, preferably between 0.1 and 0.5 mm.

Advantageously, as shown in FIG. 4, the grid 14 is made during a manufacturing method including cutting the sheet of conductive material to form the strands 16 and the junction zones 20.

It will be noted that the cutting is, for example, done by laser or by fine-blanking, or by any other method making it possible to create orifices in the plate.

According to another embodiment, the grid 14 is made by additive manufacturing, in particular by 3D printing.

According to the invention, each opening 18 is delimited by a contour with no angular points. To that end, the cutting is done so as only to form curves, with no angular points.

In the described example, the openings 18 are generally quadrilateral-shaped, preferably diamond-shaped, having a height defined along a radial direction starting from the central point, and a width along an arc of circle perpendicular to this radial direction. In the described example, the width of each opening 18 is greater than its height. In a variant, the height of each opening 18 is greater than its width. In another variant, the width and the height of each opening 18 are equal.

In the described example, the sensitive curves, to which it is necessary to pay attention not to form angular points, are formed by the rounded corners of the openings 18.

In the following description, the rounded corners defined on the width of each opening 18 are called "first rounded corners 22", and the rounded corners defined on the height of each opening 18 are called "second rounded corners 24".

The curve radii in the first 22 and second 24 rounded corners will be chosen as a function of the appearance chosen for the grid 14. For example, these curve radii are greater than half the width of each strand 16.

Advantageously, the strands 16 all have a constant thickness, over their entire length. This feature ensures a homogeneous circulation of the electric current i along each strand 16, without creating hot spots.

It will be noted that each opening 18 has a recess 26 at each of its second rounded corners 24. This recess is reflected by an inversion of the curve radii of the contour of the opening 18 between the inside of the recess 26 and the outside of the recess 26. More particularly, the recess 26 is formed by a hollow connecting the contours of two strands 16 delimiting the opening 18, said hollow being tangential to each of these two contours.

It appears that the invention proposes an effective grid 14, fully using the potential of the entire length of the strands 16, and therefore all the power allowed by this grid design, without risking its temperature exceeding a critical temperature at certain points, therefore without risk of deterioration of the grid 14. This is ensured by the absence of overlap of the strands 16, and also in one preferred embodiment, by the absence of angular point on the contours of the openings 18, and/or by the constant cross-sections of the strands 16.

Lastly, owing to the recesses 26, the contacts between the strands 16 are reduced to the minimum so as to allow the mechanical maintenance of the structure without disturbing the operation of the heating device 10.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust gas heating device for a combustion engine comprising;
    a grid; and
    a power supply device connected to the grid to pass electrical current in the grid, the grid being formed by strands delimiting openings between the strands, wherein
    the strands of the grid do not overlap,
    the strands are connected to one another in junction zones and have a same width between the junction zones, and
    the grid comprises an inner central ring from which the strands extend outward, the inner central ring having a width greater than or equal to twice the width of each strand.

2. The exhaust gas heating device according to claim 1, wherein:
    the grid has a geometric shape defined around a central point,
    each junction zone has a first dimension, in a first radial direction defined from the central point and separating the junction zone into two equal surface portions, and a second dimension in a second direction perpendicular to the first radial direction, such that at least one of the first dimension and the second dimension is larger than or equal to twice the width of each strand.

3. The exhaust gas heating device according to claim 1, wherein the grid has a constant thickness.

4. The exhaust gas heating device according to claim 1, wherein the grid has an outer contour having a shape chosen between an oval, an ellipsoid, or a circle.

5. The exhaust gas heating device according to claim 1, wherein:
    the grid comprises an outer ring from which the strands extend inward, the outer ring having a width greater than or equal to twice the width of each strand.

6. The exhaust gas heating device according to claim 1, wherein:
    the grid has a geometric shape defined around a central point,
    each opening is generally quadrilateral-shaped, a height thereof being defined along a radial direction extending from the central point, each opening having a recess at each end of its height, the recess is formed by a hollow connecting contours of two adjacent strands delimiting the opening, the hollow being tangential to each of two contours of the two adjacent strands.

7. The exhaust gas heating device according to claim 1, wherein the grid is of the type made by cutting a sheet of conductive material.

8. A combustion engine exhaust line, comprising:
an exhaust gas heating device of the type comprising a grid and a power supply device connected to the grid to pass electrical current in the grid, the grid being formed by strands delimiting openings between the strands, wherein
the strands of the grid do not overlap,
the strands are connected to one another in junction zones and have a same width between the junction zones, and
the grid comprises an inner central ring from which the strands extend outward, the inner central ring having a width greater than or equal to twice the width of each strand.

9. The combustion engine exhaust line according to claim 8, wherein:
the grid has a geometric shape defined around a central point,
each junction zone has a first dimension, in a first radial direction defined from the central point and separating the junction zone into two equal surface portions, and a second dimension in a second direction perpendicular to the first radial direction, such that at least one of the first dimension and the second dimension is larger than or equal to twice the width of each strand.

10. The combustion engine exhaust line according to claim 8, wherein the grid has a constant thickness.

11. The exhaust gas heating device according to claim 10, wherein the grid is connected to the power supply device via the inner central ring.

12. The combustion engine exhaust line according to claim 8, wherein the grid has an outer contour having a shape chosen between an oval, an ellipsoid, or a circle.

13. The combustion engine exhaust line according to claim 8, wherein:
the grid comprises an outer ring from which the strands extend inward, the outer ring having a width greater than or equal to twice the width of each strand.

14. The combustion engine exhaust line according to claim 8, wherein:
the grid has a geometric shape defined around a central point,
each opening is generally quadrilateral-shaped, a height thereof being defined along a radial direction extending from the central point, each opening having a recess at each end of its height,
the recess is formed by a hollow connecting contours of two adjacent strands delimiting the opening, said hollow being tangential to each of two contours of the two adjacent strands.

15. The combustion engine exhaust line according to claim 8, wherein the grid is of the type made by cutting a sheet of conductive material.

16. The combustion engine exhaust line according to claim 8, wherein the grid is connected to the power supply device via the inner central ring.

17. A vehicle, comprising:
a combustion engine exhaust line having an exhaust gas heating device of the type comprising a grid and a power supply device connected to the grid to pass electrical current in the grid, the grid being formed by strands delimiting openings between the strands, wherein
the strands of the grid do not overlap
the strands are connected to one another in junction zones and have a same width between the junction zones, and
the grid comprises an inner central ring from which the strands extend outward, the inner central ring having a width greater than or equal to twice the width of each strand.

18. The vehicle according to claim 17, wherein the grid is connected to the power supply device via the inner central ring.

* * * * *